Nov. 22, 1938.   T. O. HILLBOM   2,137,451
APPARATUS FOR BARKING WOOD
Filed April 23, 1936   6 Sheets-Sheet 1
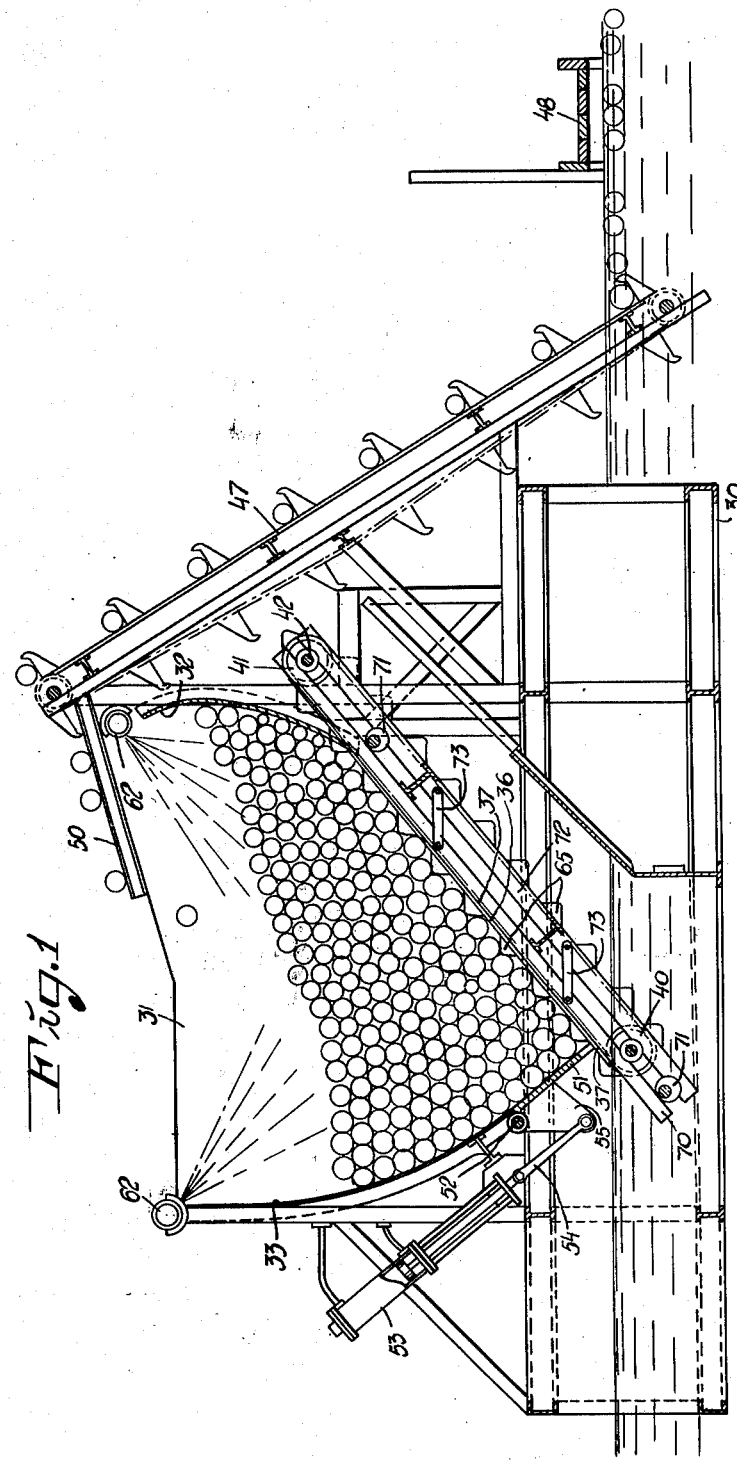

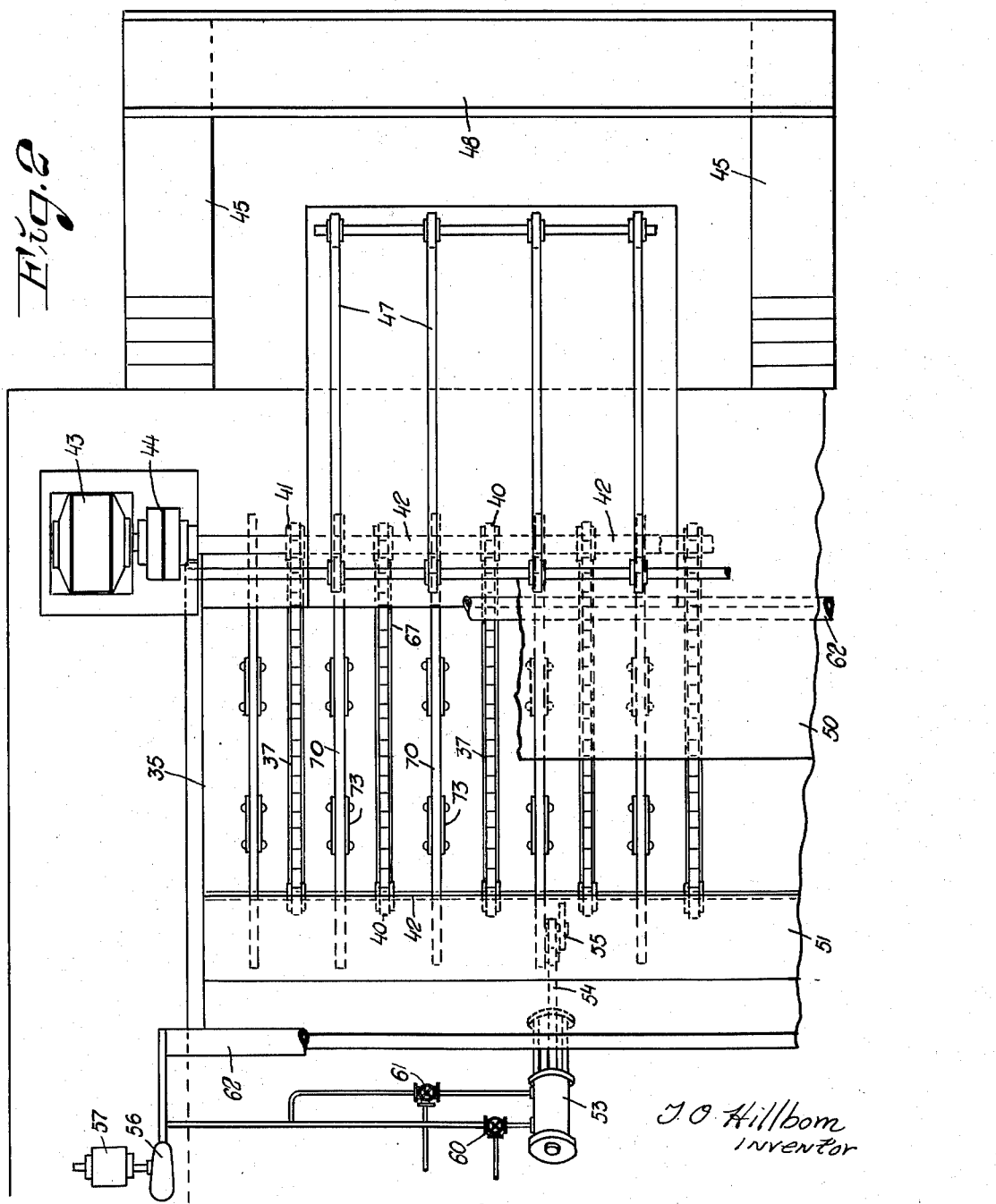

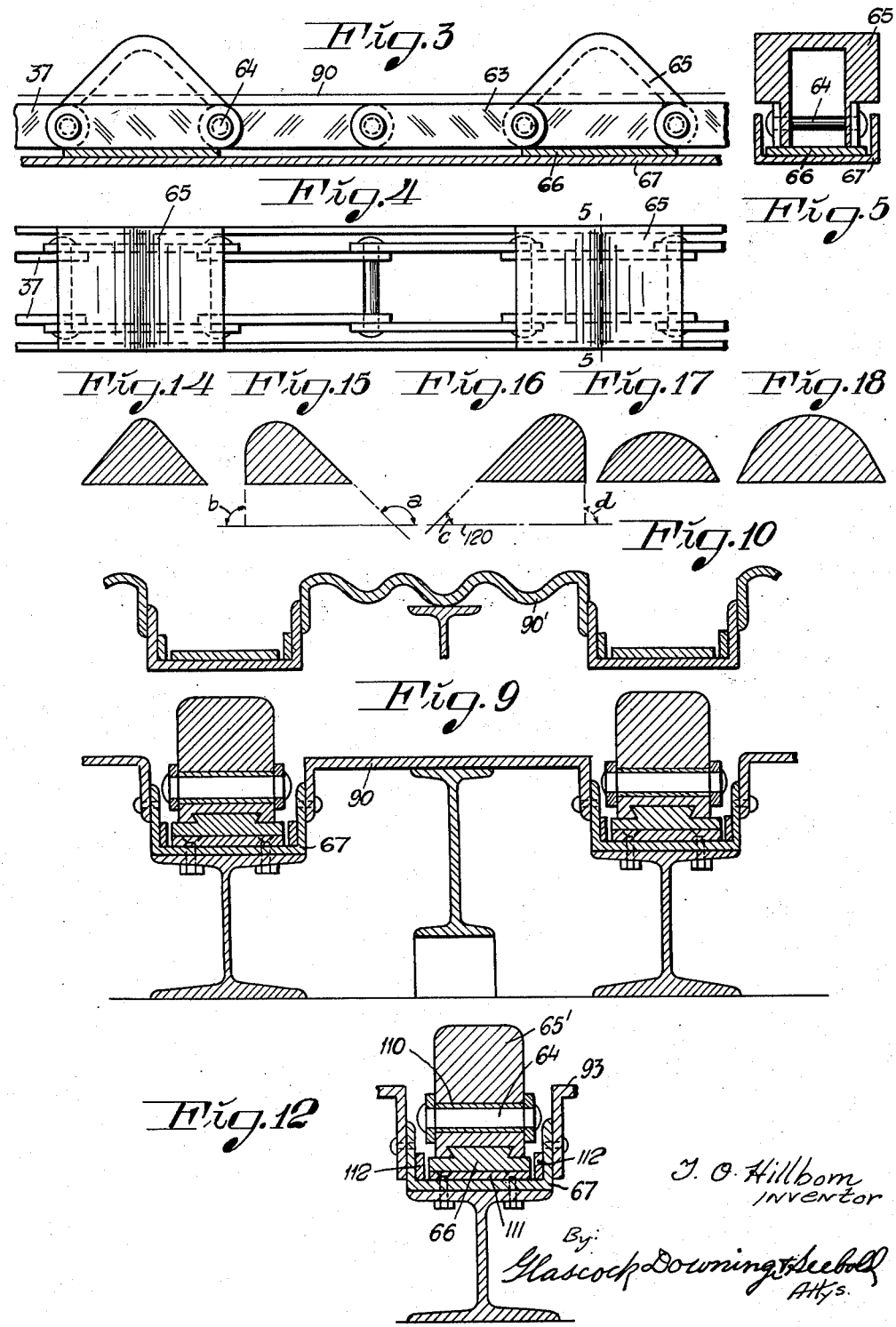

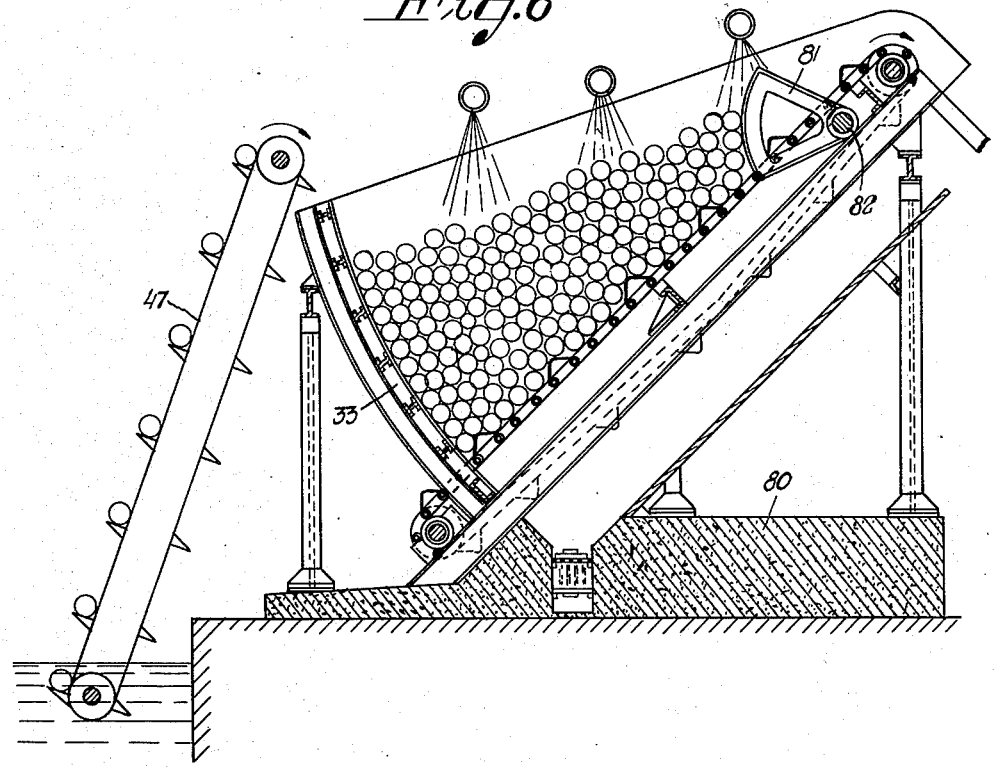
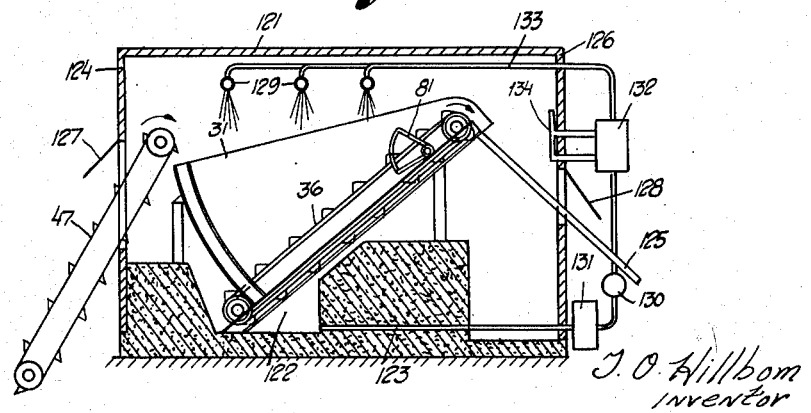

Nov. 22, 1938.    T. O. HILLBOM    2,137,451
APPARATUS FOR BARKING WOOD
Filed April 23, 1936    6 Sheets-Sheet 5
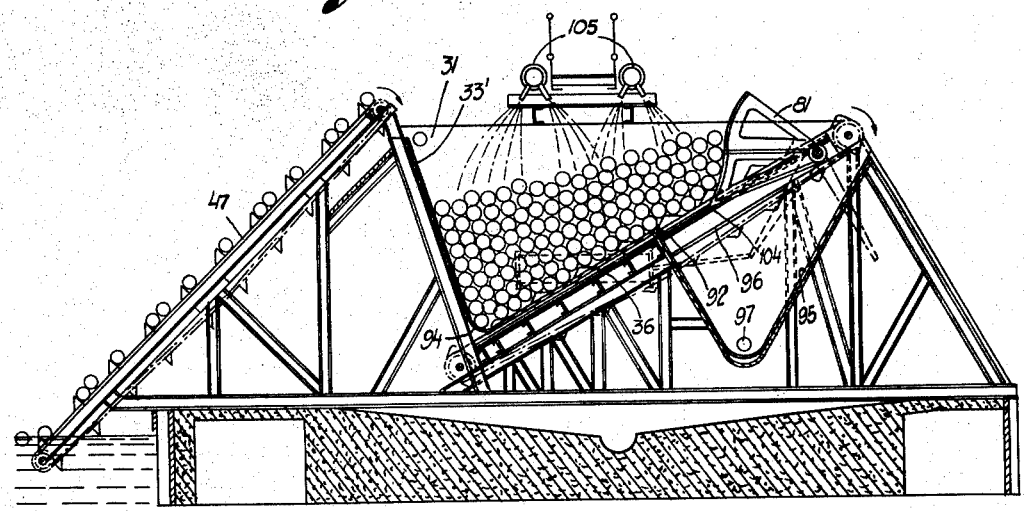
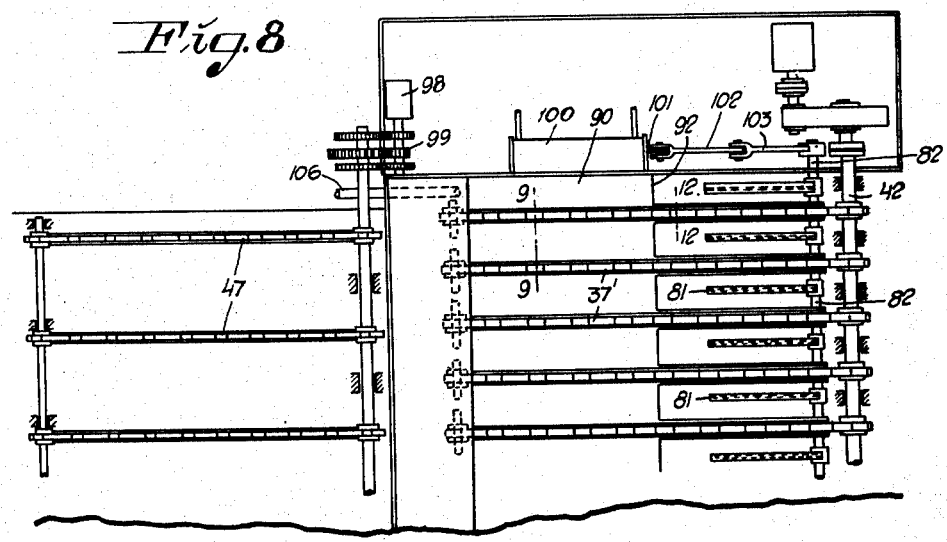
T. O. Hillbom
INVENTOR
By: Glascock Downing & Seebold
Attys.

Nov. 22, 1938.　　　T. O. HILLBOM　　　2,137,451
APPARATUS FOR BARKING WOOD
Filed April 23, 1936　　　6 Sheets-Sheet 6
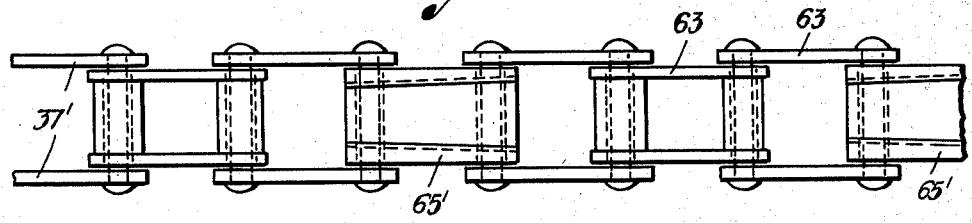
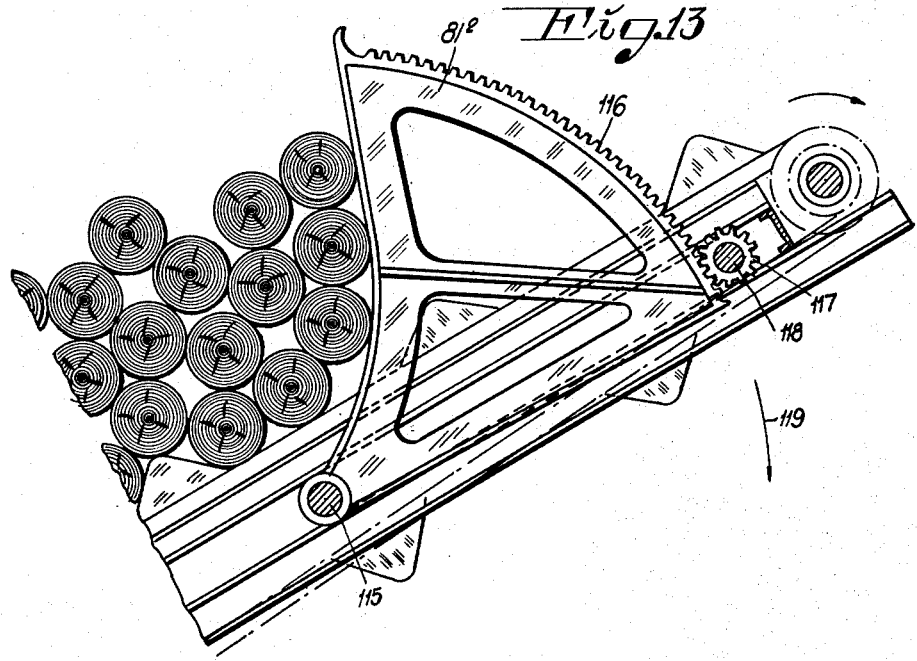
T. O. Hillbom
INVENTOR
By: Glascock Downing & Seebold
Attys Patented Nov. 22, 1938

2,137,451

UNITED STATES PATENT OFFICE 2,137,451

APPARATUS FOR BARKING WOOD

Tor Ove Hillbom, Karlshall, Lulea, Sweden

Application April 23, 1936, Serial No. 76,073
In Sweden May 21, 1935

12 Claims. (Cl. 144—208)

The most common apparatus for barking wood, such as lumber, logs and the like is the barking drum consisting of a large container in the form of a horizontal cylinder rotatable around its longitudinal axis in which during the rotation the logs are fed upwardly along the rising side of the cylinder and then roll back towards the opposite side, the barking being effected substantially by the logs rolling over and striking each other during the last-mentioned movement. In most cases the cylinder is working submerged in water. This known apparatus has an unsatisfactory output depending on the fact that a relative motion between the logs takes place substantially only in the uppermost surface layer of the log pile, where the pressure created by the weight of the logs is small, whereas the lower portions of the log pile perform substantially no motion in relation to the cylinder shell so that the barking action in these portions is insignificant.

In another known apparatus the logs are brought to pass through a plurality of pockets triangular in cross section and having eccentrics at their bottom which intermittently force the lowermost logs upwardly. In this apparatus the pressure created on the logs will be concentrated to only a small portion of the whole number of logs in the pocket, whereas the over-lying portions are only slightly raised and lowered without effecting any considerable revolving movement necessary to effect loosening of the bark. Further there is no guarantee of all or the greater part of the logs reaching the lower-most operative part of the apparatus.

My present invention relates to the barking of wood such as lumber, logs and the like according to the friction method above described and has for its main object to provide a method and an apparatus whereby the logs of the lower layer of the pile are caused effectively to roll against each other, whereas the over-lying layers by their weight increase the rubbing action of the logs towards each other.

A further object of my invention is to provide a method and an apparatus for barking wood whereby the logs which are piled up on one another in parallel relationship in a container or the like are brought to perform a motion by means of endless chains or the like provided along the wall of the container which motion is composed of a circling movement of the logs within the pile as a whole and an undulatory movement of the logs in the lowermost layer of the pile.

A still further object of my invention is to provide an apparatus for barking logs and the like comprising a container, endless chains provided along the wall of said container and impellers on said chain of such a shape as to effect a circling motion of the logs within the pile and simultaneously therewith a pulsating motion of the logs of the lower layer or layers of the pile substantially perpendicular to the direction of movement of the chains.

Further objects of my invention will be apparent according as the following description proceeds, reference being had to the accompanying drawings showing by way of example some embodiments of my invention.

In the drawings:—

Fig. 1 is a side view partly in section of a first embodiment of my new apparatus for barking logs, one side wall of the container being omitted to show the interior of the apparatus.

Fig. 2 is a plan view of Fig. 1.

Fig. 3 is a side view and Fig. 4 a plan view of part of a chain on an enlarged scale.

Fig. 5 is a cross sectional view along the line 5—5 in Fig. 4.

Fig. 6 is a view similar to Fig. 1 of a second embodiment of my invention.

Fig. 7 is a view similar to Figs. 1 and 6 of a third embodiment of my invention.

Fig. 8 is a plan view of part of Fig. 7.

Fig. 9 is a cross sectional view along the line 9—9 in Fig. 8 on an enlarged scale.

Fig. 10 is a view similar to Fig. 9 showing a modification.

Fig. 11 is a plan view on an enlarged scale used in this third embodiment.

Fig. 12 is a cross sectional view along the line 12—12 in Fig. 8 on an enlarged scale.

Fig. 13 shows a modification of this third embodiment on an enlarged scale as compared with Figs. 7 and 8.

Figs. 14 to 18, inclusive, illustrate diagrammatically different embodiments of an impeller in longitudinal sections of the operative portion thereof.

Fig. 19 is a diagrammatical view in longitudinal section of a fourth embodiment of my invention.

With reference to Figs. 1 and 2 reference numeral 30 designates a pontoon on which the barking apparatus according to my invention is mounted. The apparatus comprises a pocket-shaped container 31 open at its top and having a rigid front wall 32, preferably curve-shaped, a rigid rear wall 33 which is also curved, side walls 34 and 35 and a bottom 36 extending from the lower edge of the rear wall 33 up to the lower edge of the front wall 32 in inclined relation to the horizontal plane. The bottom 36 comprises a plurality of endless chains 37 arranged in parallel and travelling over lower sprocket wheels 40 and upper sprocket wheels 41. The upper sprocket wheels 41 are secured to a common shaft 42 which is driven by an electric motor 43 (see Fig. 2), preferably via a sliding coupling 44.

The logs are supplied to the container or pocket 31 floating on the water between two pontoons 46 (only one shown in Fig. 2) by means of chain elevators 47 driven in any suitable manner, e. g. by an electric motor, and fed with logs from a gang-board 48 supported by said pontoons 46. By the elevators 47 the logs are supplied to an inclined board 50 provided at the top of the apparatus, and from this board 50 the logs fall down into the container 31.

Provided in the rear wall 33 of the container 31 is a shutter 51 for emptying the container, when the barking operation is completed, said shutter 51 being hinged to the rear wall 33 as at 52 and operated by any suitable means. In the embodiment shown the shutter 51 is operated hydraulically by means of a servo piston motor 53, the piston rod 54 of which engages an arm 55 connected to the shutter. As seen in Fig. 2 the pressure medium, e. g. pressure water, is supplied to the servo motor 53 at the one or other side of the piston from a pump 56 driven by an electric motor 57, said supply being controlled by three-way cocks 60 and 61 each controlling inlet and outlet of each side of the piston.

Arranged at the top of the container 31, e. g. along the upper edge of the front and rear walls 32 and 33, are spraying pipes 62 serving to supply water to the container 31 and to the logs therein in order to facilitate the loosening of the bark and the removal thereof from the logs. Water is supplied to said pipes 62 by means of a pump or similar device, e. g. the same pump 56 which serves to operate the servo piston motor 53.

As shown especially in Figs. 3 to 5, inclusive, each chain is composed of pairs of links 63 pivotally inter-connected by bolts 64. Every second, third, fourth etc. of the link pairs is formed as an impeller 65, preferably of steel, projecting into the container. In the embodiment shown in these figures the operative portion of the impeller 65 has in longitudinal section substantially the form of an isosceles triangle with rounded apex. On the individual double chains 37 said impellers 65 are arranged in line with each other so as to form a kind of stairs on the container bottom 36. On their bottom surface the impellers 65 may be provided with a lining 66 of e. g. pockwood, cast iron or the like by means of which the impellers 65 slide on the web of a lying U-beam 67 provided beneath the upper driven side of the endless chains 37.

Arranged between the U-beams 67 in parallel thereto are bars 70 resting on rollers 71 arranged at the ends of the bars and eccentrically mounted in a rigid beam system 72. The bars 70 are connected to the beam system 72 by means of links 73 in such a manner as to be capable of being raised and lowered by the rotation of the rollers 71, either only at one end or at both ends. By raising or lowering the bar 70 in relation to the chains, the height of the impellers above the plane of the bar 70 may be varied and thereby also their engagement with the logs. By this means the pressure of the log pile may be transferred from the chains 37 onto the bars 70 or vice versa, and further the engagement of the impellers 65 with the logs may be adjusted at will either along the whole length of the chains or only at one end thereof, e. g. in such manner that said engagement is successively decreased towards the upper end of the chains 37.

The operation of this embodiment of the apparatus is as follows. A sufficient number of logs are introduced into the pocket 31 by means of the elevators 47. During the filling of the pocket the bars 70 should, preferably, occupy their highest position in order to spare the chains 37. When the pocket 31 is filled to the desired degree, the elevators 47 are stopped, the bars 70 are lowered into their lowest position and water is admitted through the spraying pipes 62. The motor 43 is started causing the chains 37 to travel from below and upwards to the right in Fig. 1, causing logs to perform a circling motion within the pile in the pocket 31 in counter-clockwise direction as seen in Fig. 1, that is the logs are moved upwards along the bottom 36 and the front wall 32 from where they will roll towards the rear wall 33 and down to the bottom 36 again. However, in addition to this circling motion in the log pile as a whole a sort of undulatory motion is imparted to the logs in the lower layer or layers of the log pile causing a rearrangement of the logs in said layer. This is due to the fact that the impellers 65 have such a shape and the chain bottom 36 has such an inclination towards the horizontal plane that the impellers 65 do not immovably carry along the logs of the lower layer but permit said logs during their travel along the chain bottom 36 to roll back over one or more of the stairs formed by the impellers 65. In other words, the chains 37 will move at a greater velocity than the logs of the lower layer, so that the impellers 65 will plough themselves through the bottom layer of the log pile, thereby effecting a pulsating motion of the logs in a direction substantially perpendicular to the direction of movement of the chains causing an undulatory motion of the logs of the lower layer which is propagated upwards along the bottom.

Thus, upon movement of the chains, the impellers will impart to the individual logs a motion substantially perpendicular to the movement of the chains, whereby the lowermost layer of logs, seen as a whole, will perform an undulatory or wavy motion, since the logs are raised by the travelling impellers and then fall down in the spaces therebetween.

Furthermore, it will be noted that the chains, which move upwardly at a predetermined fixed rate of speed, travel faster than the lower layer of logs, due to the fact that the logs are dependent upon the impellers to move them upwardly. As above pointed out, and as indicated in the drawings, these impellers are relatively low, that is, they do not project a great distance into the log pile. Consequently, the tendency of the logs of the lower layer is to ride over these impellers and fall back into the space between said impellers. This action is influenced by having the top surfaces of the impellers rounded and at least their front surfaces sloping in the direction of movement of the chains, as indicated in Figs. 1, 3, 7, 14, 15, 17, 18, and 19. Furthermore, the logs in the lower layer will tend to resist against being brought along with the impellers on the chains due to the influence of the pressure from the overlying layers of logs and also due to the inclination of the bottom of the container. In other words, since the lower log layer rests mainly on the rigid bottom or the rigid beams, and they do not rest on those parts of the chains which are between the impellers, the friction of the lower log layer against the rigid bottom offers a certain resistance against the movement of the logs upwardly. All these circumstances result in the lower log layer moving substantially slower upwardly than the chains whereby the impellers impart motions to said logs in a direction substantially perpendicular to the inclined wall, so that the logs will be subjected to undulatory movement and there will be a continuous change of the position and an intensive stirring up of the logs in the pile, whereby the friction between the logs and the barking effect will be very intense.

The above said circling motion of the whole log pile but especially the motion of the individual logs of the lower layer in relation to each other as above described will cause strong settings in the log pile on account of the pressure of the over-lying layers, resulting in an effective barking action. The bark thus loosened from the wood will by its own weight and under the action of the streaming water escape from the container 31 through the openings between the chains 37 and the bars 70, the bark falling down directly into the water. Evidently, the bark may also fall down on a conveyor arranged beneath the lowest point of the container. In an apparatus according to my invention in which long logs are treated in parallel arrangement such outlet openings for the bark extending in the direction of movement of the chains involves the advantage of the bark being easily removed from the container due to the fact that the bark pieces have a tendency of adjusting themselves in the direction of movement. Such a rapid removal of the bark from the log pile is, of course, of great importance for attaining a good barking action.

When the barking operation is completed the motor 43 is stopped and the shutter 51 is opened by operating the servo motor 53 causing the logs to leave the container or pocket 31 under the action of their own weight. In order to facilitate the rolling down of the logs and to spare the chains the bars 70 may during the emptying operation occupy their highest position. When the pocket 31 is emptied the shutter 51 is again closed whereupon the operation may be repeated.

In the embodiment of my invention above described the logs are, as shown, fetched up from the water and after barking returned to the water. However, the apparatus may also be situated on land. Such an embodiment is shown in Figs. 6 and 7.

According to these figures the barking apparatus is mounted on a basement of concrete 80. As in the previous embodiment the apparatus is filled with logs by the elevators 47 which fetch the logs from the water. The rear wall 33 of the container has no emptying shutter, but the apparatus is adapted to be emptied at the upper end of the chains. For this purpose the rigid front wall of the apparatus shown in the previous embodiment is replaced by a plurality of sector-shaped parts 81 rigidly mounted on a common shaft 82. In the position shown on the drawings said sectors form a sort of damming device preventing the logs from leaving the apparatus and causing them to roll back towards the rear wall 33. When the container 31 is to be emptied, the sectors are swung away downwardly permitting free passage of the barked logs over the upper end of the chains 37.

In the previous embodiments the bottom of the container is formed by chains and supporting bars arranged therebetween. In treating logs of widely varying length and diameter there is a risk of wood pieces falling down through the openings between the chains and the bars. This risk is eliminated in the embodiment shown in Figs. 7 to 12, inclusive, by the bars being replaced by longitudinal strips 90 covering the spaces between two adjacent chains 37 and secured to the supporting U-beams 67 thereof as shown in Fig. 9. According to this figure these strips 90 are plane, but according to Fig. 10 they may be corrugated as shown at 90' resulting in a certain increase of the barking action by the logs striking said corrugations when having passed a row of impellers 65 of the chain system. Due to these strips the bottom 36 of the container 31 is maintained closed except for the spaces between the chain links intermediate of the impellers.

However, the bottom of the container is not unbroken throughout its whole longitudinal extension but only in its lower part, the strips 90 terminating as at 92. In the remaining part of the bottom 36 the logs rest on supporting bars 93 secured to the U-beams 67 as shown in Fig. 12 and extending from point 92 up to the driving shaft 42 of the chains 37, said bars being of such a width as to leave openings between them.

This unbroken part of the bottom of the container prevents, of course, also bark from falling down through the bottom. Hereby it is possible to decrease somewhat the height of the apparatus as compared with the previous embodiments as no conveyor for the bark needs to be provided at the lowest point of the container.

Arranged at the angle between the rear wall and the bottom of the container is a somewhat rounded plate as shown at 94 preventing bark from being collected at said angle. The bark falls down to the bottom of the container and is carried along upwardly by the logs until it reaches point 92 where the intermediate strips 90 terminate. Then the bark is permitted to fall down through the openings between the chains into a pocket 95 e. g. of sheet iron placed beneath the bottom 36 from point 92 and upwards. In order to protect the lower side of the chain against down-falling bark pieces a roof may be provided composed of strips 96 arranged above the lower side of the chains and having a width substantially equal to that of the impellers 65.

At the lowest point of the bark collecting pocket 95 a conveyor may be provided to remove the bark, but in most cases it is sufficient to provide a pipe 97 in the one side wall of the pocket 95 through which pipe water is supplied to wash away the bark. In this case the bottom of the pocket may be arranged at an angle to the horizontal plane so as to cause the water jet to wash away the bark to the other side of the pocket where it may be freed from water in a strainer of some kind or other.

With regard to other details the apparatus according to this embodiment is substantially built in the same manner as those previously described. However, instead of being curved as in said embodiments the rear wall 33' of the container is straight whereby the apparatus is simplified. Further the rear wall 33' is shown to be somewhat steeper than in the previous embodiments.

The elevators 47 are shown to be operated by an electric motor 98 connected with a common shaft 99 of sprocket wheels of said elevators.

The sectors 81 serving as damming-up means for the logs during the barking operation are operated hydraulically by means of a servo motor 100 substantially similar to that shown in Figs. 1 and 2 for the operation of the shutter. The servo motor has inlet and outlet for a pressure medium and its piston rod 101 is by means of a coupling rod 102 connected to an arm 103 rigidly secured to the common shaft 82 of the sectors 81. As shown in Fig. 7 the side of the sectors 81 facing the log pile is curved in such manner as to facilitate the passage of the logs from the chains to the sectors. The sectors 81 may be secured in working position by means of a stop bar 104.

The spraying means comprises spraying pipes 105 suspended above the pocket 31. In addition thereto a spraying pipe 106 may be arranged at the lower corners of the container serving in addition to the above-said curved plate 94 to prevent bark from being collected at this place.

The bolts of the chains are mounted in metal bushings 110, and the bottom lining 66 of the impellers 65 is secured thereto by a dove-tail joint. The dove-tail slots in the impellers taper in a direction opposite to the direction of movement of the chains (see Fig. 11) causing the linings to be pressed rigidly into the slots during operation. Plates 111, preferably of steel secured to the upper surface of the U-beams 67 and lateral guiding rods 112 serve to prevent tearing of said beams. The impellers slide in the bearing plates 111. It may be observed that the chain links 63 are relieved from the pressure of the log pile, said pressure being borne by the bottom strips 90 at the lower portion of the bottom wall 36 and by the supporting bars 93 at the upper portion of said wall. It may also be observed that instead of strips 90 covering the whole space between the chains 37' the U-beams 67 of said chains may also in their lower portion only be provided with supporting bars of the same width as bars 93.

According to Fig. 13 the sectors 81² are swingably mounted on a common shaft 115 and their rear edge is formed as a toothed segment 116 meshing with a gear 117 on a shaft 118, which may be coupled to an electric motor (not shown in this figure). When the container 31 is to be emptied the sectors 81² are swung in clockwise direction as shown by the arrow 119.

The longitudinal section of the impellers may vary according to the prevailing working conditions, the nature of the wood, the manner in which the barked material is fed out of the apparatus and so on, it being, however, essential that they have at their top such a rounded shape that the logs on their travel upwardly along the chain bottom are only partially carried along by the impellers but permitted to roll back over one or more of the impeller rows.

In Figs. 14 to 18, inclusive, I have shown longitudinal sections of different embodiments of impellers.

The embodiment shown in Fig. 14 corresponds essentially to that shown in the previous figures.

According to Fig. 15 the impeller has a front surface which forms an obtuse angle $a$ with the direction of movement of the chains designated by the arrow 120 and a rear surface forming with said direction a less obtuse, e. g. right angle $b$.

According to Fig. 16, the impellers have substantially the same shape as in Fig. 15 but are oppositely directed. Thus their rear surfaces form an acute angle $c$ with the direction of movement whereas their front surfaces with said direction form a less acute, e. g. right angle $d$.

According to Figs. 17 and 18 the impellers have in longitudinal section the form of a sector of a circle or ellipse.

The width of the impellers should be such that the surface thereof bearing on the logs is sufficiently large as not to cause damage of the wood surface. Further, the radius of curvature at the apex of the impeller should not be too small, as otherwise the wood surface may also be damaged.

In Fig. 19 an embodiment according to my invention is shown diagrammatically in which means are provided to subject the logs to a heat treatment during the barking operation. The container 31 is surrounded by a closed casing 121 and partly submerged into a wall 122 in a basement 123, e. g. of concrete. The elevators 47 serving to supply logs to the container project through an opening in the rear wall 124 of the casing 121, whereas an inclined conveyor 125 for the discharge of the barked logs extends from the upper end of the chain bottom 36 through an opening in the opposite wall 126 of the casing, which openings may during the barking operation be closed by means of suitable shutters 127 and 128, respectively. Warm water is sprayed on the logs in the container 31 through a spraying device 129, and water admixed with bark is sucked by a pump 130 through a separator 131 in which the bark is separated, the water being then pumped into a heating means 132 to raise its temperature from where a pipe 133 conducts the warm water to the spraying device 129. The walls of the casing 121 are, preferably, insulated and, if desired, the interior of the casing may besides by the heat of the circulating warm water, be heated in any suitable manner, e. g. by warm water, steam or warm air. In Fig. 19 I have shown a heating element 134 through which warm heating medium from the heating device 132 may circulate.

This heat treatment may be utilized in a following process of treatment of the wood, as the wood is considerably softened on account of the high temperature which facilitates its treatment in e. g. grinding mills, defibrators, cutting machines or cellulose boilers.

The filling and emptying operations may, if desired, be effected continuously, but the best results ought to be obtained in intermittent working, that is barking a charge of logs, emptying the container, then filling the container with a new charge and so on. In order to improve the co-operation between a barking plant and a following working machine, e. g. a cutting machine, which should work continuously to obtain the best result, it is preferred to use two or more barking apparatus arranged in parallel which apparatus are charged and emptied alternately so as to permit an approximately continuous supply to the following working machine. A further equalization may be effected by the provision after the barking apparatus of a magazine in the form of a water basin enabling a fully continuous operation of the working machine.

When the length of the logs vary widely, it is preferred to provide two or more barking machines of different width in parallel, the logs supplied being divided into a corresponding number of groups according to their length whereby an improved barking effect is obtained.

In order to shorten the time necessary for the treatment of the logs in each apparatus and thereby to increase the possibility of a continuous operation in such cases where this is especially desired, it is preferred to arrange two or more barking apparatus in series and to let the logs pass through said apparatus in succession.

What I claim is:—

1. An apparatus for barking wood such as lumber, logs and the like, comprising a container in which the logs or the like are adapted to be piled on one another in parallel relation, said container having an inclined bottom wall, a plurality of chains arranged along said wall for moving the logs upwardly along said wall, impellers movable with said chain, a lining fixed to said impellers by a dove-tail joint tapering in a direction opposite to the direction of movement of the chains, said impellers imparting a motion to said logs in a direction substantially perpendicular to the inclined wall, thereby causing rolling of the logs and rubbing of the same against one another and forcing the logs to move in a substantially orbital path within the container.

2. An apparatus for barking wood such as lumber, logs and the like, comprising a container in which the logs are adapted to be piled on one another in parallel relation, said container having a straight inclined bottom wall, movable members arranged along said wall for moving the logs upwardly along the wall and in an orbital path within the container, said movable members also imparting an additional motion to said logs in a direction substantially perpendicular to the inclined wall and causing the logs of the lower layer of the pile to move with less velocity upwardly along the wall than said movable members, damming means including a plurality of sector-shaped members arranged between said movable members at the upper extremity of said inclined wall for normally limiting the upward motion of the logs and for preventing same from discharging from the container, and a rotatable shaft rigidly supporting said sector-shaped members for simultaneously actuating the latter to move same out of the path of said moving logs.

3. An apparatus for barking wood such as lumber, logs and the like, comprising a container in which the logs are adapted to be piled up on one another in parallel relation, said container having an inclined bottom wall and a pocket at the upper end of said wall, said bottom wall including movable members spaced from one another, and extending over said pocket, means on said movable members for moving the logs upwardly along the wall and imparting to the logs a combined motion composed of a movement in an orbital path within the container and a movement in a direction substantially perpendicular to the inclined wall, thereby causing rolling of the logs and rubbing of the same against one another for removing the bark therefrom as well as moving the bark rubbed off the logs upwardly along the wall and discharging same into said pocket between the movable members at the upper end of the inclined wall.

4. An apparatus for barking wood such as lumber, logs and the like, comprising a container in which the logs are adapted to be piled up on one another in parallel relation, said container having an inclined bottom wall including movable members arranged along the wall and spaced from one another and means to close the openings between said movable members except for a portion at the upper ends thereof, means on said movable members for moving the logs upwardly along the wall and imparting to the logs a combined motion composed of movement in an orbital path within the container and a movement in a direction substantially perpendicular to the inclined wall, thereby causing rolling of the logs and rubbing of the same against one another for removing the bark therefrom, a bark collecting pocket arranged below the open upper portion of the wall and adapted to receive the bark rubbed off the logs and moved upwardly along the wall and discharged through said open upper portion, and means for discharging the bark from the pocket.

5. An apparatus for barking wood such as lumber, logs and the like, comprising a container in which the logs are adapted to be piled on one another in parallel relation, said container having an inclined bottom wall, a plurality of movable chains extending along said wall, for moving the logs upwardly along same, impellers movable with the chains, a lining fixed to said impellers by a dove-tail joint tapering in a direction opposite to the direction of movement of the chains, bars for supporting said lining, and lateral guiding bars for guiding said linings and impellers as they move with the chains, said impellers imparting a motion to the logs in a direction substantially perpendicular to the inclined wall, thereby causing rolling of the logs and rubbing of the same against one another and forcing the logs to move in a substantially orbital path within the container.

6. An apparatus for barking wood such as lumber, logs and the like, comprising a container in which the logs are adapted to be piled on one another in parallel relation, said container having an inclined bottom wall, a plurality of movable chains extending along said wall, for moving the logs upwardly along same, impellers, bushings in the impellers, bolts mounted in said bushings, and connecting the impellers to the chains so as to cause same to move therewith, a lining fixed to said impellers by a dove-tail joint tapering in a direction opposite to the direction of movement of the chains, said impellers imparting a motion to the logs in a direction substantially perpendicular to the inclined wall, thereby causing rolling of the logs and rubbing of the same against one another and forcing the logs to move in a substantially orbital path within the container.

7. An apparatus for barking wood such as lumber, logs and the like, comprising a container in which the logs or the like are adapted to be piled on one another in parallel relation, said container having an inclined bottom wall and a substantially rigid side wall, movable members arranged along said inclined wall for moving the logs upwardly along said wall and in an orbital path within the container, said movable members also imparting a motion to the logs in an additional direction substantially perpendicular to the inclined wall, thereby causing rolling of the logs and rubbing of the same against one another, swinging means arranged at the upper end of said inclined wall and normally maintained in the path of movement of said logs for limiting the upward motion of the logs and deflecting them away from said inclined wall, and a hydraulic piston motor for rotating said rotatable means and moving the latter out of the path of movement of said logs whereby the latter may be discharged from the upper end of said inclined wall.

8. An apparatus for barking wood such as logs and the like, comprising a container in which the logs or the like are adapted to be piled on one another in parallel relation, said container having an inclined bottom wall, consisting partly of inclined bars, extending from the lower to the upper part of the container and spaced apart from each other, and partly of movable members arranged in the spaces between said bars and travelling along the same for moving the logs upwardly along the wall, said movable members including means for imparting a motion to said logs in a direction substantially perpendicular to the inclined wall, said means consisting of impellers arranged at intervals on the said movable members, said impellers being rounded at the top and tapering towards the top seen from the side, and channel shaped members extending along said movable members and adapted to guide the said movable members.

9. An apparatus for barking wood such as logs and the like, comprising a container in which the logs or the like are adapted to be piled on one another in parallel relation, a plurality of chains spaced from one another laterally and arranged along an inclined path and adapted to move the logs upwardly along said path and to maintain them in their parallel relationship during such movement, channel shaped members extending along said path and adapted to guide the said chains, damming means at the upper part of said chains, a plurality of impellers secured at intervals to said chains and movable therewith, and having rounded tops projecting upwardly beyond said channels, the front surfaces of said impellers forming an obtuse angle with the upper surfaces of those parts of the chains which lie in front of said front surfaces, means for preventing the logs in the pile from resting upon those parts of the chains which are located between the impellers, said impellers being adapted to permit the lower layer of the pile to move upwards with a less velocity than the chains and to allow the logs when being stopped in their movements upwards by the said damming means to roll down on the lower log layers of the pile.

10. An apparatus for barking wood such as logs and the like, comprising a container in which the logs or the like are adapted to be piled on one another in parallel relation, a plurality of chains spaced from one another laterally and arranged along an inclined path and adapted to move the logs upwardly along said path and to maintain them in their parallel relationship during such movement, supporting members for said chains extending along the underside of the chains, said chains including means for imparting a motion to said logs in a direction substantially perpendicular to the inclined wall, said means consisting of impellers arranged at intervals on the said chains, said impellers being rounded at the top and tapering towards the top seen from the side, said impellers sliding on said supporting members, and means for preventing the logs in the pile from resting upon those parts of the chains which are located between the impellers.

11. An apparatus for barking wood such as logs and the like, comprising a container in which the logs or the like are adapted to be piled on one another in parallel relation, means for moving the logs in an inclined path from the lower to the upper part of the container, said means consisting of a plurality of chains travelling along said path and spaced apart from one another laterally, impellers projecting at intervals from the upper side of said chains, rigid members arranged laterally of said chains along said path and adapted to support the logs, said rigid members extending above the chains to prevent the logs in the pile from resting upon those parts of the chains which are located between the impellers, damming up means arranged in said container in the path of said upwardly moving logs for normally preventing said logs from passing out of said container at the upper ends of the chains, said damming up means being movable out of said path of moving logs to permit the latter to pass over the same and discharge from the container.

12. An apparatus for barking wood such as logs and the like, comprising a container in which the logs or the like are adapted to be piled on one another in parallel relation, said container having an inclined bottom wall provided with channels therein, endless chains arranged in said channels and having a plurality of members secured thereto and movable therewith, said members projecting above the inclined wall for moving the logs upwardly along said wall and in an orbital path within the container, said members being adapted in addition to causing said orbital motion to effect a circling motion of the individual logs within the pile and to permit the logs of the lower layer of the pile to move with less velocity than the chains, thereby effecting an undulatory motion of the logs in said layer.

TOR OVE HILLBOM.